(No Model.) 7 Sheets—Sheet 1.

F. W. LUDINGTON.
MACHINE FOR ASSEMBLING CLOTH COVERED BUTTONS.

No. 598,711. Patented Feb. 8, 1898.

(No Model.)
7 Sheets—Sheet 2.

F. W. LUDINGTON.
MACHINE FOR ASSEMBLING CLOTH COVERED BUTTONS.

No. 598,711. Patented Feb. 8, 1898.

(No Model.)  7 Sheets—Sheet 3.

F. W. LUDINGTON.
MACHINE FOR ASSEMBLING CLOTH COVERED BUTTONS.

No. 598,711.  Patented Feb. 8, 1898.

(No Model.) 7 Sheets—Sheet 4.

F. W. LUDINGTON.
MACHINE FOR ASSEMBLING CLOTH COVERED BUTTONS.

No. 598,711. Patented Feb. 8, 1898.

(No Model.)

F. W. LUDINGTON.
MACHINE FOR ASSEMBLING CLOTH COVERED BUTTONS.

No. 598,711.

Patented Feb. 8, 1898.

(No Model.) 7 Sheets—Sheet 7.

F. W. LUDINGTON.
MACHINE FOR ASSEMBLING CLOTH COVERED BUTTONS.

No. 598,711. Patented Feb. 8, 1898.

Witnesses Frederick W. Ludington.
 Inventor.
 By atty Earle Seymour

UNITED STATES PATENT OFFICE.

FREDERICK W. LUDINGTON, OF WATERBURY, CONNECTICUT, ASSIGNOR TO THE L. C. WHITE COMPANY, OF SAME PLACE.

MACHINE FOR ASSEMBLING CLOTH-COVERED BUTTONS.

SPECIFICATION forming part of Letters Patent No. 598,711, dated February 8, 1898.

Application filed April 24, 1897. Serial No. 633,755. (No model.)

*To all whom it may concern:*

Be it known that I, FREDERICK W. LUDINGTON, of Waterbury, in the county of New Haven and State of Connecticut, have invented a new Machine for Assembling Cloth-Covered Buttons; and I do hereby declare the following, when taken in connection with the accompanying drawings and the letters of reference marked thereon, to be a full, clear, and exact description of the same, and which said drawings constitute part of this specification, and represent, in—

This invention relates to an improvement in machines for assembling button parts, and particularly to that class of buttons in which the face or cap is covered with a fabric or other flexible material which in itself forms the finished surface of the buttons, and in illustrating the invention I have shown a button in which the back is provided with a wire eye, by which the button may be secured.

Most generally the parts of the buttons, which consist of a cover, a metal cap, and a back having a wire eye secured thereto, have been assembled in foot-presses, in which the parts have to be separately handled and the several dies required in uniting the parts alternately placed by hand in position to perform their necessary function in the operation of assembling the button.

The object of this invention is the production of a machine in which the parts of the button are fed to dies or holders, in which they are presented in turn to devices which automatically operate to assemble the several parts; and the special object of this invention is to firmly secure the edges of the covering between the cap and back; and it consists in the construction and the combination of devices, as will be hereinafter described, and particularly recited in the claims.

The bed A of the machine is suitably supported, and beneath it, at the rear, are two shafts arranged one above the other in bearings depending from the under side of said bed. The upper shaft B is the main shaft and is driven by a pulley B', secured to one end, while its other end is provided with a gear-wheel $B^2$, which meshes with a gear-wheel C', secured to the end of the lower shaft C and so that the said lower shaft is driven by the upper shaft.

On the center of the bed is an upright guide D, in which a slide D' is arranged for vertical movement through a lever $D^2$, mounted at the rear of the guide, a pitman $D^3$, secured to the rear end of the lever, and a cam $D^4$ on the main shaft which moves the lower end of the pitman. From the outer face of the upper end of the slide D' projects a bracket $D^5$, in the under face of which is a recess to receive a punch E, the lower end E' of which corresponds to the diameter of the finished button and is surrounded by a sleeve $E^2$. This sleeve is formed with a square-shouldered annular rib $E^3$ near its lower end for engagement with a shoulder *f*, formed on the inner edge of a latch F, which is pivoted to the upper end of the punch and which is held against the sleeve $E^2$ by a spring F'. The lower end $F^2$ of said latch projects beyond the lower end of the sleeve, for the purposes hereinafter set forth.

Upon the surface of the bed, near the forward end, is a dial G, which revolves with a vertical shaft G', to which it is keyed, and which extends through the bed and supports at its lower end a ratchet-wheel H, which is also keyed to it. Around the edge of the dial is a flange $G^2$, corresponding in height to the length of the hub $G^3$, upon which rests a disk $G^4$, formed with a series of openings $G^5$, and opening into each of said openings is a slot $G^6$. The diameter of the dial and disk is such that as the dial revolves the openings $G^5$ will be successively presented beneath the punch, and the slots $G^6$ are so arranged as to receive the lower end $F^2$ of the latch F. In the dial beneath each opening in the disk is a hole $G^7$, in which are located a series of vertically-arranged dies. The dies J in alternate holes in the dial are surrounded by sleeves J', having heads $J^2$, the outer faces of which project through the disk, so as to extend flush with the upper face thereof, and are formed with circular recesses $J^3$, corresponding in diameter to the diameter of the lower end of the sleeve $E^2$. Below the face of each head is a short shoulder $j$, which prevents the head from being forced upward through the disk. The dies K in the intermediate holes have centrally-arranged vertical holes $k$ extending through them and are surrounded by sleeves K', having heads $K^2$, the upper faces of which project through the disk so as to extend flush with the upper face thereof. The edges of the heads around the central openings are formed with a cam edge or bevel $k'$, and below the face is a shoulder $k^2$, which not only prevents the upward movement of the head through the disk, but, being of larger diameter than the diameter of the heads $J^2$, projects beneath the slots $G^6$ into the path of the lower end $F^2$ of the latch F and so as to throw the latch outward and its shoulder $f$ out of engagement with the rib $E^3$ of the sleeve $E^2$. Surrounding each of the sleeves J' K' is a spring L, which, resting on the dial and extending to the under surface of the heads, yieldingly supports the sleeves in an elevated position with their faces flush with the upper surface of the disk and also to a certain extent acts as vertical guides for the sleeves.

Figure 1:
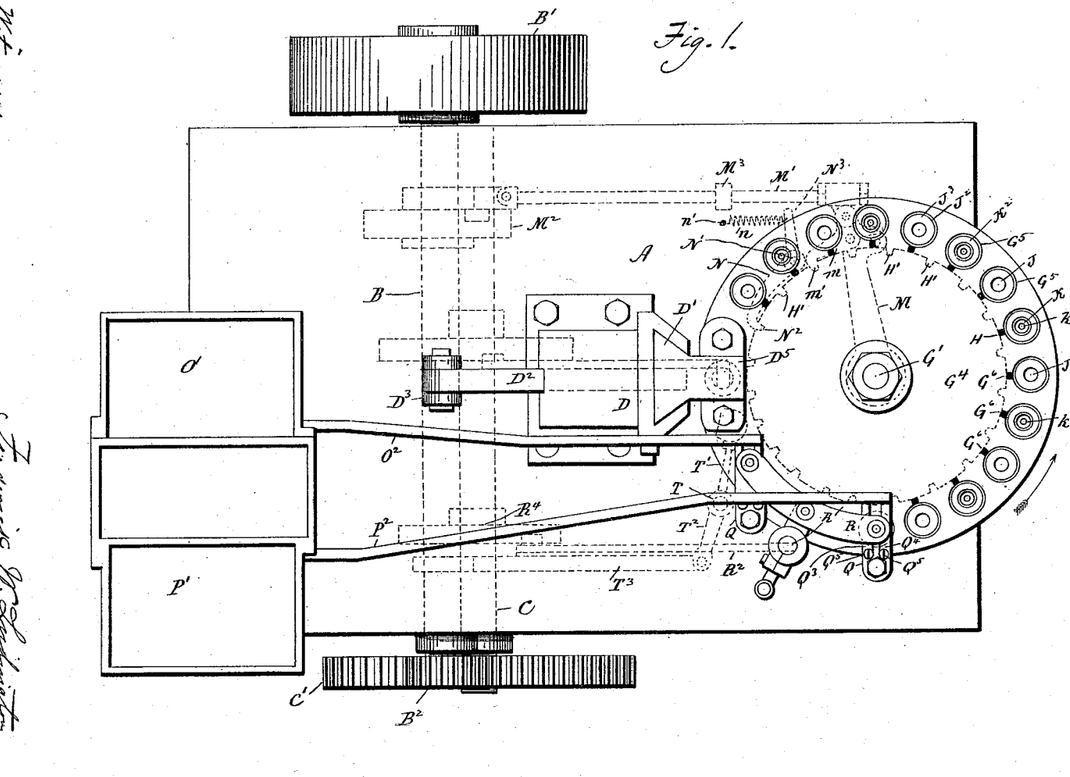
Figure 1, a plan view of a machine embodying my invention.
Figure 2:
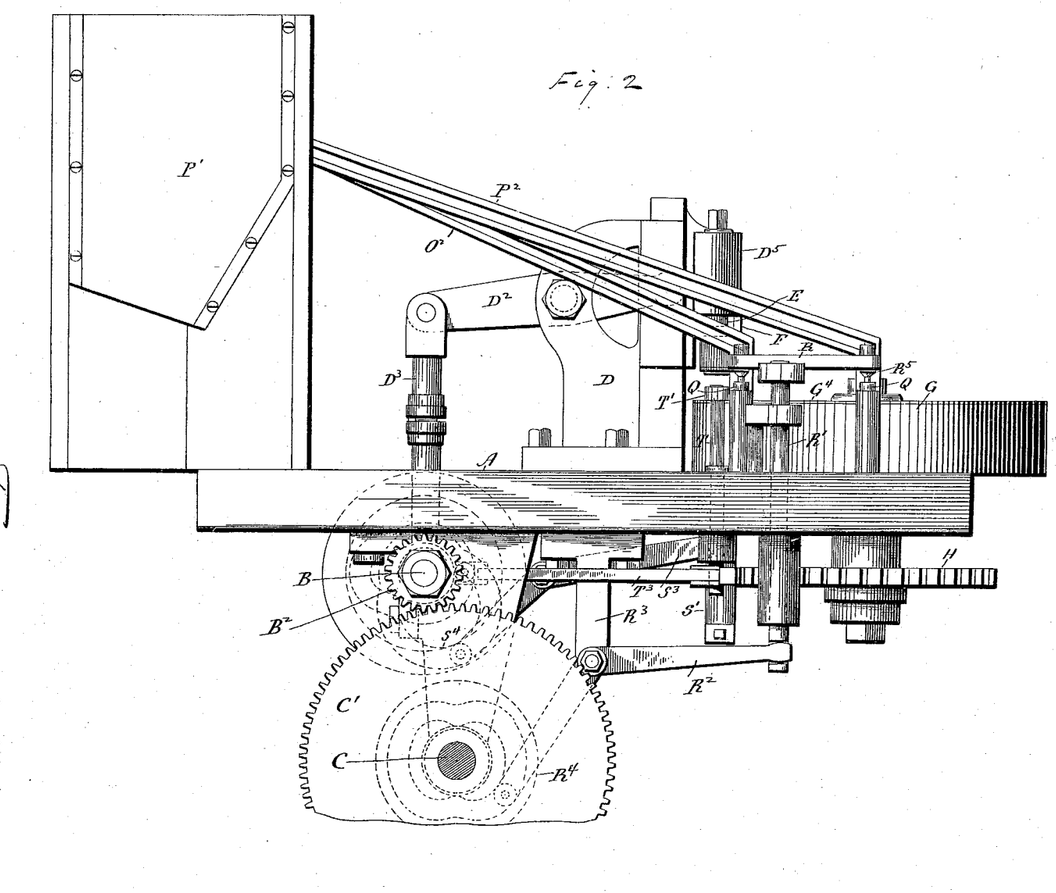
Fig. 2, a side view of the same.
Figures 3, 4, 5, 6:
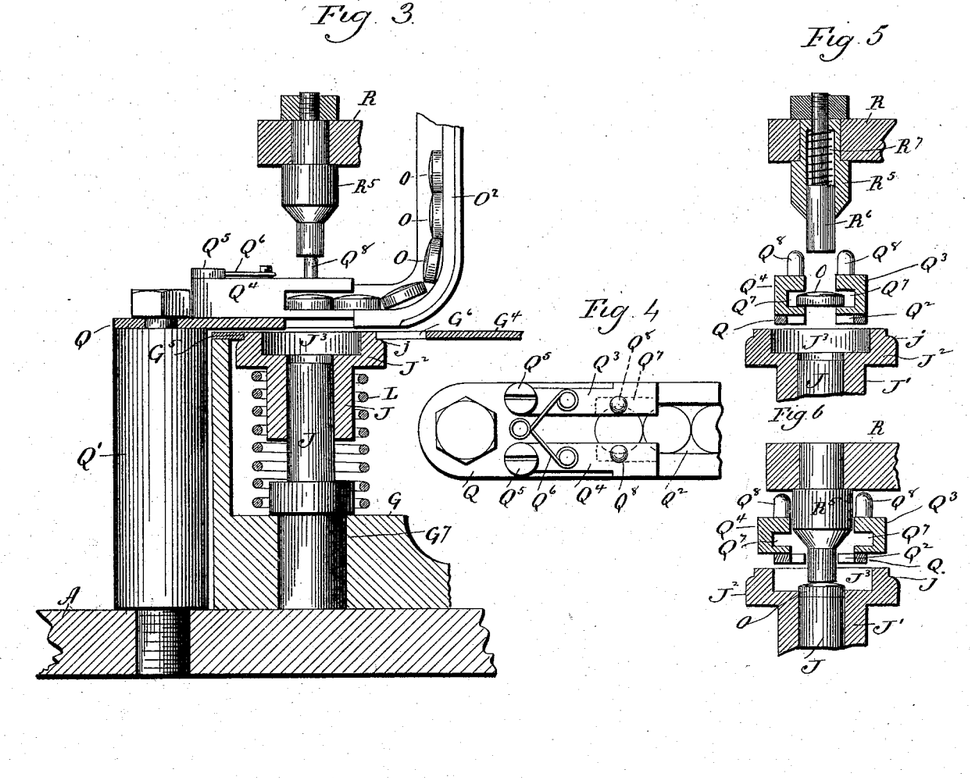
Fig. 3, a side view, partially in section, of a portion of the dial and the lower end of one of the chutes and the means for delivering the parts from the chute to the dial.
Fig. 4, a plan view of the lower end of the chute, with the retaining-jaws.
Fig. 5, a sectional view through the feeding device and jaws, with the jaws in the closed position.
Fig. 6, a similar view with the feeding device depressed.
Figure 7:
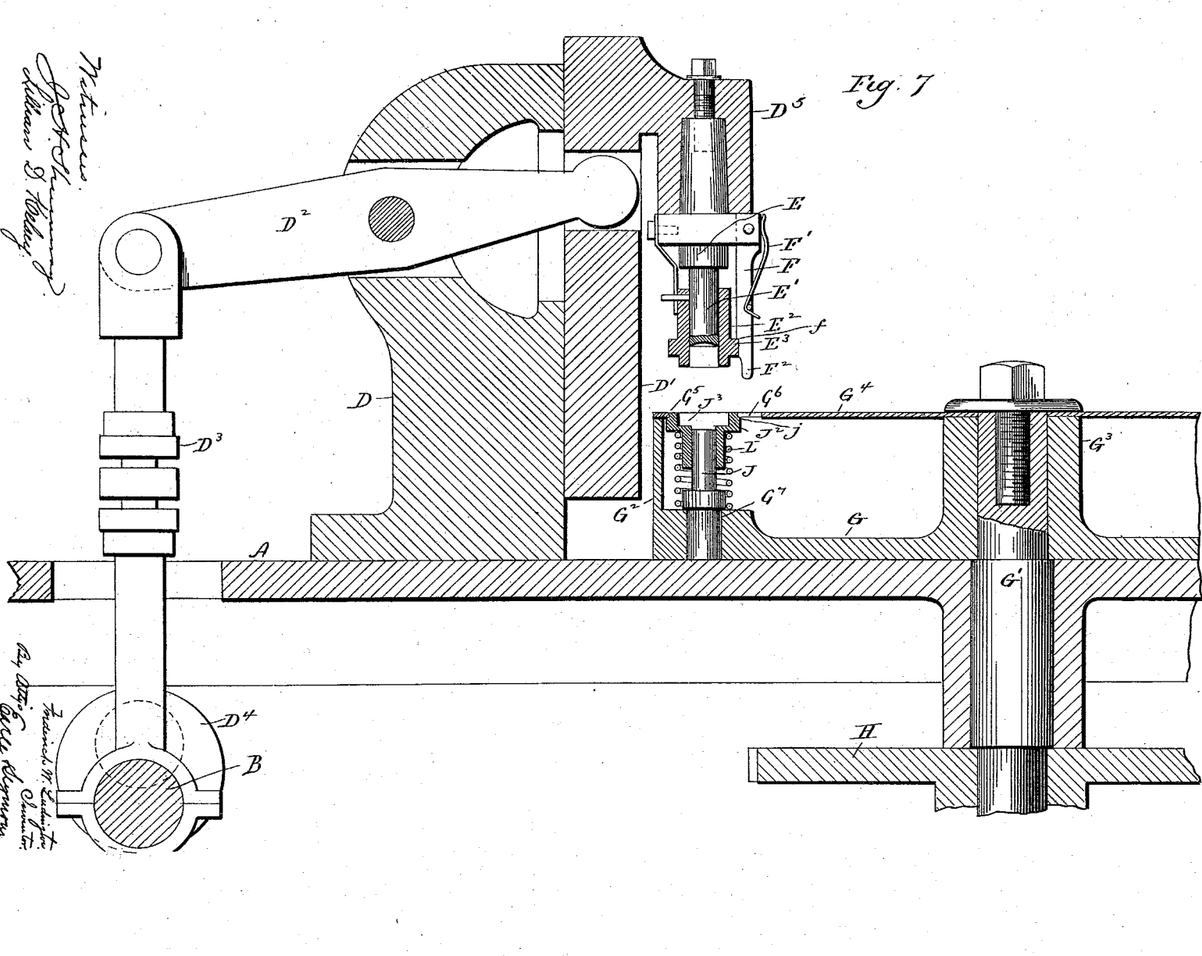
Fig. 7, a sectional view of the punch, a portion of the dial, and adjacent parts.

To operate the dial, which is turned in the direction of the arrow in Fig. 1, an arm M is secured to the shaft G' and projects beyond the edge of the ratchet-wheel H, where it is coupled with a rod M', which is moved backward and forward by a cam $M^2$ on the main shaft B. The arm M is connected with the rod M' by the arm $m^2$ of a bell-crank pawl $m$, the face $m'$ of which is adapted to enter the notches H' of the ratchet-wheel H, and so that as the rod M' is moved backward the arm $m^2$ immediately causes the nose of the pawl to engage with one of the notches of the ratchet-wheel, so as to turn said wheel, and thereby the dial, the number of teeth in the ratchet corresponding to the number of holes in the dial. As soon as the rod M' moves forward the arm $m^2$ lifts the face $m'$ out of engagement with the ratchet-wheel, so that the reverse movement of the dial is avoided.

To properly locate the holes in the dial beneath the punch, I arrange a dog N upon a vertical stud N', depending from the under face of the bed and formed at one end with nose $N^2$ for engagement with the notches H' of the ratchet-wheel H and at the other end with a tail $N^3$, which extends into the path of a stop or projection $M^3$ on the rod M'. To the tail a spring $n$ is attached, the other end of which is secured to a post $n'$, also depending from the under face of the bed. This dog N holds the dial in position as the arm M is turned backward, which permits the pawl to slip out of one notch into the next one, and the stop $M^3$ is so located that just before the rod M' reaches its extreme forward position the stop strikes the tail of the dog and lifts the nose out of engagement with the wheel, and so that the dial is free to be revolved by the engagement of the pawl with the ratchet, and as soon as the stop releases the dog the nose will ride on the periphery of the ratchet-wheel until the said wheel has been turned to bring the next notch into the path of the nose of the dog, which will then be forced into it by the spring $n$, and so as to arrest further movement of the dial, and this occurs when one of the dies is beneath the punch.

The caps or heads O of the buttons and the back P, which are of usual construction, are placed in quantities in the hoppers O' P', from whence they are delivered by any suitable automatic mechanism or fed by hand to the chutes $O^2$ $P^2$, by which they are conducted to the position over the disk and to the left of the punch and in line with the respective dies J K.

As the construction of the hopper and feeding mechanism therein form no part of this invention, they will not be further described, as they may be of any well-known devices for this purpose.

The lower end of each chute is supported by an arm Q, fixed to the upper end of the post Q', mounted on the bed A, adjacent to the dial. In each arm is an opening $Q^2$, corresponding in size to the diameter of the part being fed, and on the upper surface of the plates are jaws $Q^3$ $Q^4$, adapted to swing horizontally on pivots $Q^5$, and are normally drawn toward each other by a spring $Q^6$. The inner faces of the ends of the jaws are formed with short grooves $Q^7$, which virtually form a continuation of the chutes, but also form stops to arrest and hold the parts above the respective dies. From the upper face of each jaw, on opposite sides of the opening $Q^2$, projects a round-ended stud $Q^8$.

To feed the parts from the chutes or the jaws, in which the lowermost part is held, to the dies J K, I arrange a segment R above the ends of the chutes, which is supported upon the upper end of a vertically-movable rod R', guided through the bed and operated by a bell-crank lever $R^2$, pivoted to an arm $R^3$, depending from the bed, which lever is moved by a cam $R^4$ on the lower shaft C. This segment is provided with sleeves $R^5$ over the end of each chute, the lower ends of which sleeves are tapered for engagement with the studs $Q^8$, and through the sleeves extend punches $R^6$, which are preferably reduced at their upper ends, around which are arranged springs $R^7$, forming a cushion, to avoid breakage in case the parts should not properly feed. Between the punch E and the feeding device I arrange a lifter, which consists of a vertical rod S, guided through the bed by a tubular guideway S', secured to the under side of the bed, which rod is coupled with one end of a link $S^2$, the other end of which is connected with a bell-crank lever $S^3$, also mounted beneath the bed and operated by a cam $S^4$ on the shaft B, the said rod when lifted being adapted to pass upward through the dies J, so as to lift a button resting thereon above the plane of the disk. Mounted on the upper end of a vertical rock-shaft T is a sweeper or stripper arm T', adapted to ride over the surface of the disk and provided with a semicircular end in the path of the vertical lifter-rod S. The lower end of the rock-shaft T is secured to an arm $T^2$, which is operated through a link $T^3$ by a cam $T^4$ on the shaft B and so timed that when the lifter rises the arm $T^2$ will be turned to sweep the finished button from the dial and into a suitable chute or conduit. (Not shown.) The mechanism is so timed that the feeding, lifting, and stripping devices only operate at every other stop in the rotation of the dial and movement of the punch and so that two succeeding dies are successively presented beneath the punch before the stripping and feeding operations take place.

Figures 8, 9:
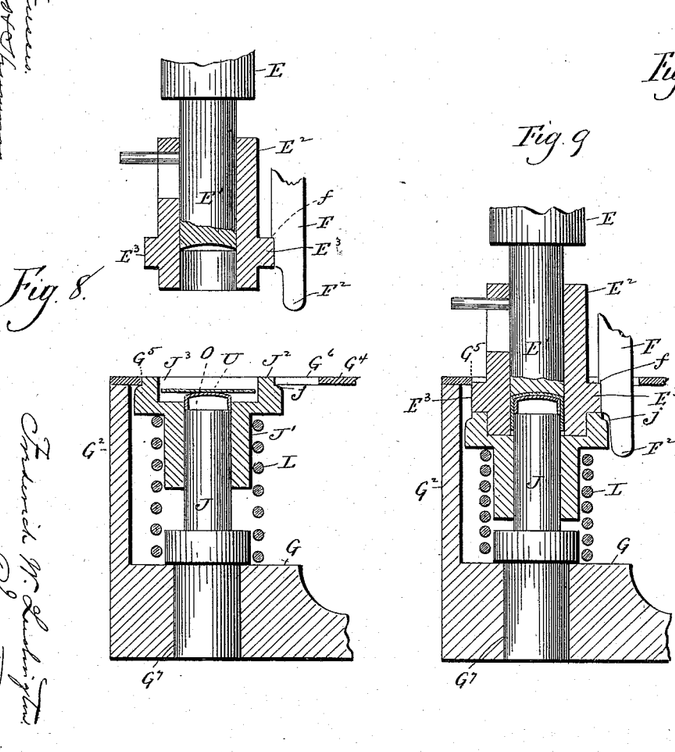
Fig. 8, a sectional view of the punch and one of the dies, with the parts thereof, prior to the first operation in the assemblance of a button.
Fig. 9, a view of the same parts with the punch in the depressed position.
Figure 10:
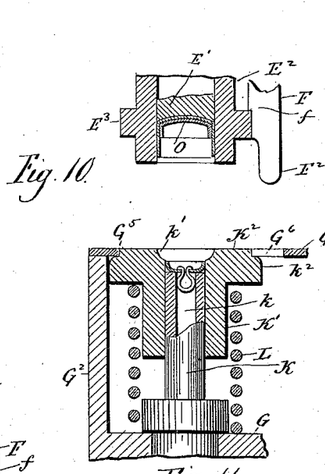
Fig. 10, a sectional view of the punch containing the cap and cover of the button and arranged over the second die, which carries the button back.
Figure 11:
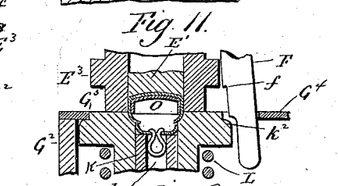
Fig. 11, a view of the similar parts in the first closing movements.
Figure 12:
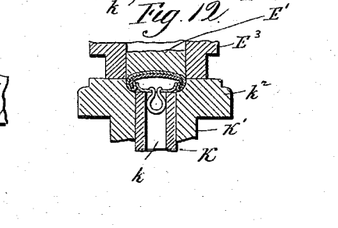
Fig. 12, a similar view illustrating the final closed position.
Figure 13:
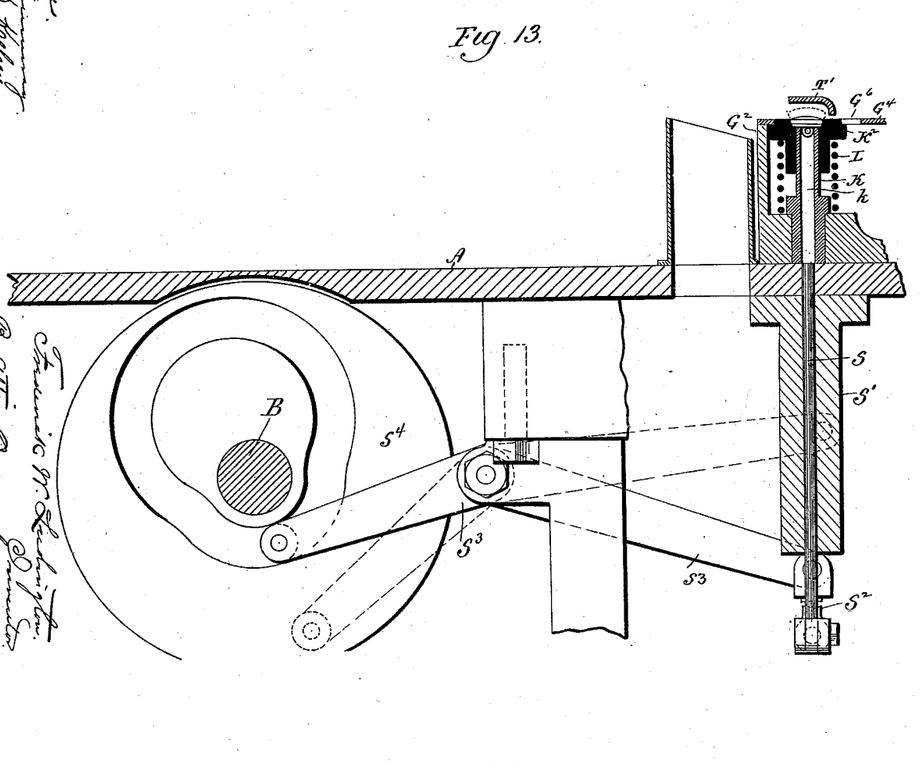
Fig. 13, a sectional view of the means for lifting the finished button from the die.
Figure 14:
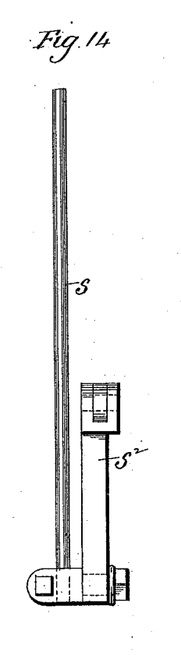
Fig. 14, a side view of the lifter and its operating-link detached.
Figures 15, 16:
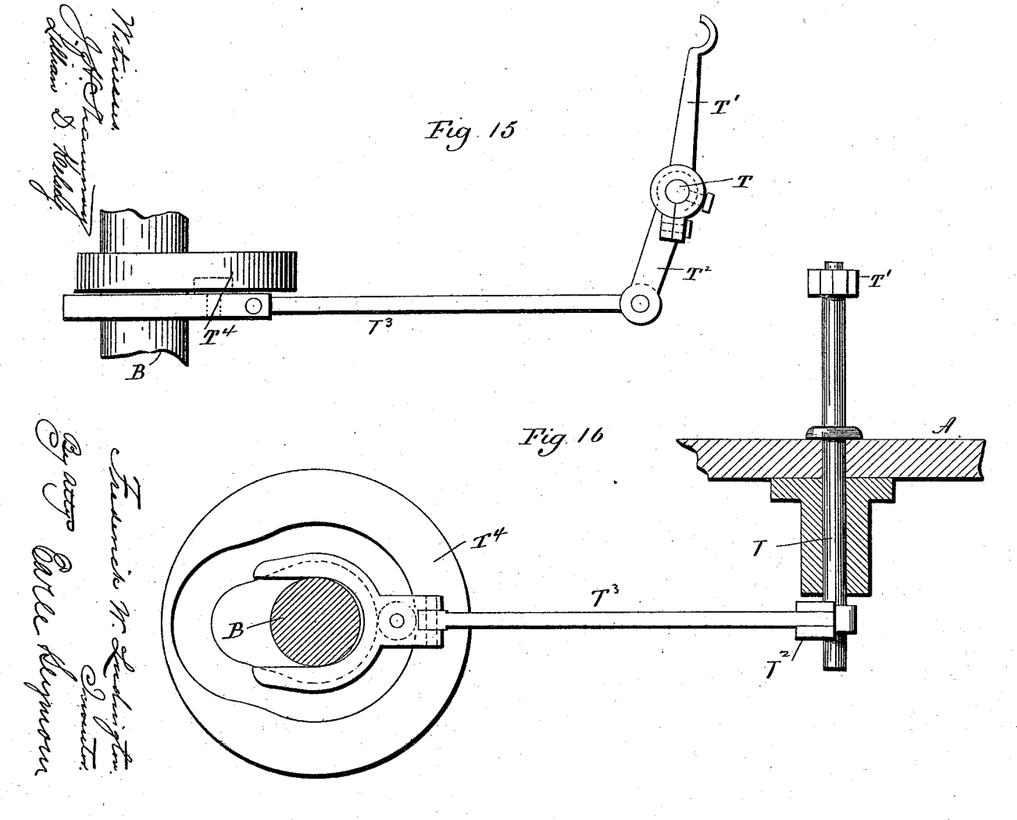
Fig. 15, a top view of the sweeper.
Fig. 16, a side view of the same.

The operation of the machine is as follows: Assuming that one of the dies J is beneath the end of the chute O' and one of the dies K beneath the end of the chute P', the segment R is depressed by the movement of the cam $R^4$, which turns the bell-crank lever $R^2$, so as to force the shaft R' downward. In this downward movement of the segment the beveled ends of the sleeves $R^5$ strike the upper ends of the stud $Q^8$, and so as to force them apart and thereby separate the jaws $Q^3$, which releases the parts over the openings $Q^2$, which by the continued downward movement of the segment are forced out of the jaws by the punch $R^6$ and onto the respective upper ends of the dies J K, and this movement is repeated at every step in the rotation of the dial. As the dial is revolved disks U of the material which is to form the face of the button are placed in the recess $J^3$ over the caps O therein, and as shown in Fig. 8. The caps and disks are thus in turn presented beneath the punch, the sleeve E of which is held in a down position by the latch F, as also shown in Fig. 8. When the die J is thus at rest beneath the punch, the punch descends and the end of the sleeve enters the recess in the head of the sleeve and presses the said head downward and so that the cap and covering are forced into the end of the sleeve and against the lower end of the punch, as shown in Fig. 9, in which position they are frictionally held. The punch then rises and the dial is moved another step to present a die K beneath the punch, which die supports at its upper end a back $p$, the eye of which, if there be one, rests in the hole $j$ in the die. The punch again descends and the end $F^2$ of the latch strikes the shoulder $k^2$ of the head, by which it is tripped, as shown in Fig. 11, so as to release the sleeve $E^2$, which when it strikes the face of the head will be arrested and permits the punch E to move downward independent of it. In thus moving downward the edge of the covering is deflected by the bevel $k'$, and so as to be turned inward thereby, as shown in Fig. 11, in which its edge projects inward beyond the edge of the back. At this time the sleeve comes to a bearing at the upper end of the punch and is moved downward with it, and its lower end forces the head $K^2$ downward, which permits or causes the cap and its covering to pass over the upper edge of the back, while at the same time the edges of the cap are deflected by the bevel $k'$, so as to turn or crimp that edge inward over the edge of the back, as shown in Fig. 12, whereby the covering is securely held between the cap and back. As the punch rises it will draw out of the sleeve sufficiently to cause the shoulder on the sleeve to again engage with the latch F and ready to repeat the first-described operation. The complete button is thus left upon the upper end of the die K, which in the next step forward is brought over the lifter-rod S, which is lifted by the lever $S^2$, operated through the bell-crank lever $S^3$ by the cam $S^4$, which raises the button above the surface of the dial, as shown in Fig. 13, when the sweeper-arm T' comes into operation and its semicircular end catches the button and removes it from the face of the disk to a suitable chute. It will thus be seen that the punch performs two operations in assembling the button: first, in picking up the cap and covering, and, secondly, in uniting the said cap and covering with the back, and thus the parts arranged over two consecutive dies are removed for each complete operation, and when these two cleared dies pass beneath the feeding mechanism that mechanism is operated to again supply them with the required parts. With the mechanism thus described the covering for the button is firmly secured between the cap and back and the cap tightly crimped over the back, as will be seen in the practical automatic machine, in which the only manual labor necessary is that required in feeding the covering-disks. In some styles of covering these disks may also be fed automatically from the hopper in the same manner that the other parts are fed to the dies; but in cloth-covered buttons it is found that the disks of cloth are so thin that practical feeding of one at a time is impracticable with the rapid running of the machine. In some cases a wad or packing is required between the cap and back of the button, and if required may be fed from a suitable hopper, so as to be delivered in the same manner as the parts herein described into the open upper ends of the backs after the said backs have been fed to the dies K, or they may be placed therein by hand as the dial revolves in front of the operator.

While for convenience of illustration I have shown and described my invention as applied to buttons, it is apparent that other articles, such as nails or tacks, may be capped in a similar machine, the head of the tack or nail corresponding to the button-back herein shown and described.

Having thus fully described the construction and operation of my machine, what I claim, and desire to secure by Letters Patent, is—

1. In a machine for assembling button parts, the combination with a dial adapted to have a step-by-step rotation, and carrying dies arranged in pairs, of chutes for presenting parts of the buttons over the said dies where they are temporarily held, means for forcing the parts of the buttons from said chutes at every other step during the rotation of the dial, and a punch adapted to pick up the part presented beneath it by one step of the dial, and unite it with the part presented by the next step of the dial, substantially as described.

2. In a machine for assembling button parts the combination with a dial adapted to have a step-by-step rotation, chutes for delivering the parts of the button over the said dial, spring-jaws at the ends of said chutes by which the parts are temporarily held, punches arranged above said jaws and means for depressing said punches so as to open the said jaws and deliver the parts therein onto said dial at every other step in its rotation, and an assembling-punch adapted to pick up the part presented by the first step and assemble it with the part presented by the next step, substantially as described.

3. In a machine for assembling button parts, the combination with a dial adapted to have a step-by-step rotation and carrying dies arranged in pairs, the alternate dies formed with integral cam edges, chutes for presenting the parts to be assembled over said dial, jaws at the ends of said chutes, and adapted to hold the lowermost part in the chute, punches arranged above the ends of the chutes and adapted to deliver the parts held by the jaws to the said dial at every other step in the rotation thereof, and a vertically-movable assembling-punch comprising a punch and tubular sleeve thereon, a latch for engagement with said sleeve, and whereby the said punch picks up the part presented by one step in the rotation of the dial and assembles it with the part presented by the next succeeding step, substantially as described.

4. In a machine for assembling button parts, the combination with a vertically-movable punch, a horizontally-arranged dial carrying dies which are successively presented beneath the punch, a ratchet-wheel connected with said dial, the bell-crank, a pawl mounted on an arm adjacent to said ratchet and engaging with the teeth of the ratchet, whereby it is rotated, and a dog pivoted near the edge of the ratchet formed at one end with a nose for engagement with the teeth of the ratchet, and at the other end with a tail adapted to be tripped by the movement of the shaft which operates the pawl, and whereby the ratchet is held against backward movement during the backward movement of the pawl, substantially as described.

In testimony whereof I have signed this specification in the presence of two subscribing witnesses.

FRED. W. LUDINGTON.

Witnesses:
   WILLIS M. HALL,
   GEO. J. LINES.